(12) United States Patent
Kondo et al.

(10) Patent No.: US 8,974,048 B2
(45) Date of Patent: Mar. 10, 2015

(54) PRINTING METHOD

(75) Inventors: Takamitsu Kondo, Shiojiri (JP); Toru Takahashi, Azumino (JP); Hiroshi Wada, Azumino (JP); Kazuyoshi Tanase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 256 days.

(21) Appl. No.: 13/426,279

(22) Filed: Mar. 21, 2012

(65) Prior Publication Data

US 2012/0242740 A1    Sep. 27, 2012

(30) Foreign Application Priority Data

Mar. 22, 2011    (JP) ................................. 2011-063045

(51) Int. Cl.
| C09D 11/00 | (2014.01) |
| C09D 11/101 | (2014.01) |
| B41J 2/155 | (2006.01) |
| B41J 2/165 | (2006.01) |

(52) U.S. Cl.
CPC ............... *C09D 11/101* (2013.01); *B41J 2/155* (2013.01); *B41J 2/16585* (2013.01)
USPC ........................................................ 347/100

(58) Field of Classification Search
CPC ...... C09D 11/101; B41J 2/155; B41J 2/16585
USPC ........................................................ 347/100
See application file for complete search history.

(56) References Cited

U.S. PATENT DOCUMENTS

| 2006/0155002 A1* | 7/2006 | Odell et al. .................... 522/178 |
| 2007/0242098 A1* | 10/2007 | Sudo et al. ....................... 347/40 |
| 2008/0252673 A1 | 10/2008 | Wada et al. |
| 2009/0041991 A1 | 2/2009 | Takano et al. |
| 2009/0195587 A1* | 8/2009 | Walmsley et al. .............. 347/15 |

FOREIGN PATENT DOCUMENTS

| CN | 101054018 A | 10/2007 | |
| JP | 2003-127517 A | 5/2003 | |
| JP | 2008-221832 A | 9/2008 | |
| JP | 2009-226904 A | 10/2009 | |
| JP | 2009226904 A | * 10/2009 | ................ B41J 2/01 |
| JP | 2010-155374 A | 7/2010 | |
| JP | 2010-188632 A | 9/2010 | |
| WO | 2007/097049 A1 | 8/2007 | |

* cited by examiner

*Primary Examiner* — Laura Martin
(74) *Attorney, Agent, or Firm* — Maschoff Brennan (57) ABSTRACT

A printing method including: ejecting an ink which includes a designated compound is ejected from a first nozzle row which is relatively move in an intersection direction intersecting a direction along the nozzle row with respect to a medium, ejecting the ink while relatively moving in the intersection direction to the medium, from the end portion of a second nozzle row which is overlapped with the end portion of the first nozzle row in a direction along the nozzle row direction, wherein when nozzles of the nozzle rows which are partly overlapped with each other in a direction along the nozzle row share with each other to form a common dot line, the amount of ink ejected per unit area in the partly overlapping region is larger than the amount of ink ejected per unit area in a non-overlapping region.

8 Claims, 6 Drawing Sheets

PRINTING METHOD

CROSS-REFERENCE TO RELATED APPLICATIONS

This application claims priority to Japanese Patent Application No. 2011-063045 filed on Mar. 22, 2011. The entire disclosure of Japanese Patent Application No. 2011-063045 is hereby incorporated herein by reference.

BACKGROUND

1. Technical Field

The present invention relates to a printing method.

2. Related Art

The market for a photocurable ink jet printer is expanding. When an ink jet printer ejects a water-based ink or an organic solvent-based ink, a media needs to absorb the solvent. However, the photocurable ink jet printer has an advantage that the media does not have to absorb the solvent. Therefore, the printer may be adapted to media formed of various materials.

A large-sized media such as a large-sized signboard, a banner, an indoor or outdoor display advertisement, a car sticker, a placard and an interior finishings is one of the applications of the photocurable ink jet printer. Therefore, a head needs to be enlarged to improve the printing speed. As one method to enlarge the head, there is a method in which a carriage is configured with a plurality of heads combined. However, if ends of an adjacent nozzle row are arranged in line, from assembly precision, a variation in distance between the ends of the adjacent nozzle rows becomes larger than a variation in distance between the nozzles, and it may cause a problem in printing quality.

Therefore, it is proposed that the ends of the adjacent nozzle rows be arranged to be overlapped. By doing so, in a region where nozzles are partly overlapped (hereinafter, referred to as an overlapping region), the amount of ink ejected per unit area can be controlled to be the same as the amount of ink ejected per unit area in a non-overlapping region. Also, it is possible to correct the discharge amount of ink in the nozzles in the overlapping region by arranging the ends of the adjacent nozzle row to be partially overlapped.

JP-A-2009-226904 discloses that the end of the first nozzle row and the end of the second nozzle row to be overlapped. JP-A-2010-188632 discloses a correction method of correcting the discharge amount of the ink.

The photocurable ink used in the photocurable ink jet printer has a property of being cured by light (ultraviolet light). Therefore, when the photocurable ink jet printer is in the standby state, the photocurable ink which remains in the nozzle is changed by environmental light. The changed photocurable ink may adhere to the nozzle and become foreign material.

When the foreign material adheres in the vicinity of the nozzle, as a result, the ink ejected is deflected and does not land in a desired position. If the ink does not land at the desired position, pixels occur in which ink lands multiple times or pixels occur in which no ink lands. In these regions, the concentration becomes lower, thereby decreasing the quality of the printing. In particular, in a region where the two overlapping nozzle rows form the image, in cases such as when ink is properly ejected from one nozzle row and deflection occurs in another array, this trend is noticeable.

In addition, in the region where plural overlapping nozzle rows form the image, since the deflection affects the meandering of the medium during transporting, the probability of forming the pixels in which the ink does not land further increases. Thus in the region where the nozzles of the plural overlapping nozzle rows form the image, it is desirable not to decrease the picture quality.

SUMMARY

An advantage of some aspects of the invention is that it does not decrease the picture quality in the region where the nozzles of the plural overlapping nozzle rows form the image.

According to an aspect of the invention, there is provided a printing method including: ejecting an ink which includes a compound shown by the following formula from a first nozzle row which is relatively move in an intersection direction intersecting a direction along the nozzle row with respect to a medium, and the ink while relatively moving in the intersection direction to the medium, ejecting the ink while relatively moving in the intersection direction to the medium, from the end portion of a second nozzle row which is overlapped with the end portion of the first nozzle row in a direction along the nozzle row direction, wherein when nozzles of the nozzle rows which are partly overlapped with each other in a direction along the nozzle row share with each other to form a common dot line, the amount of ink ejected per unit area in the partly overlapping region is larger than the amount of ink ejected per unit area in a non-overlapping region.

[Chem. 1]

Even though the photocurable ink present in the nozzle is changed by environmental light, since probability that the photocurable ink becomes foreign material adhered to the nozzle is reduced, it is possible to suppress a decrease of the picture quality in the region where the end portion of the first nozzle row and the end portion of the second nozzle row are overlapped with each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

By the accompanying drawings and the specification, at least, the following will become apparent.

A printing method including: ejecting an ink which includes a compound shown by the following formula is ejected from a first nozzle row which is relatively move in an intersection direction intersecting a direction along the nozzle row with respect to a medium, ejecting the ink while relatively moving in the intersection direction to the medium, from the end portion of a second nozzle row which is overlapped with the end portion of the first nozzle row in a direction along the nozzle row direction, wherein when nozzles of the nozzle rows which are partly overlapped with each other in a direction along the nozzle row share with each other to form a common dot line, the amount of ink ejected per unit area in the partly overlapping region is larger than the amount of ink ejected per unit area in a non-overlapping region.

[Chem. 2]

When the printing is carried out by ejecting ink from the nozzle in the overlapping region of the plural nozzle rows, there may be an influence from meandering of the medium during transporting, therefore, the ink does not land in the correct position and the probability of forming the pixels on which the ink does not land increases compared with the non-overlapping region. However, according to the printing apparatus described above, since the amount of ink ejected in the region where the plural nozzle rows overlap has been increased in advance, pixels in which the ink does not land may be filled. And it is possible to suppress a decrease in the picture quality. In addition, even though the photocurable ink present in the nozzle is changed by environmental light, since probability that the photocurable ink becomes foreign material adhered to the nozzle is reduced, it is possible to suppress a decrease in the picture quality in the region where the end portion of the first nozzle row and the end portion of the second nozzle row overlap.

Also, it is desirable that the ink be an ultraviolet curable ink and an ultraviolet light irradiation device that cures the ink by irradiating ultraviolet light be used.

In such cases, even though the photocurable ink present in the nozzle is changed by environmental light, since probability that the photocurable ink becomes foreign material adhered to the nozzle is reduced, it is possible to suppress a decrease of the picture quality in the region where the end portion of the first nozzle row and the end portion of the second nozzle row overlap.

Also, it is desirable that the amount of ink ejected per unit area in the partly overlapping region be uniformly increased than the amount of ink ejected per unit area in a non-overlapping region.

By increasing the amount of the ink ejected per unit area in the partly overlapping region, it is possible to suppress a decrease of the picture quality.

Also, it is desirable that the amount of ink ejected from the nozzles of the partly overlapping nozzle rows be equally shared in the formation of a dot common line.

By doing so, the ink ejected can be dispersed into the first nozzle row and the second nozzle row.

Also, it is desirable that the amount of ink ejected be determined based on a grayscale that is obtained by multiplying parts of image corresponding to the partly overlapping region by a value greater than 1.

By doing so, the amount of ink ejected in the partly overlapping region may be suitably increased.

Also, it is desirable that the amount of fluid ejected per unit area in the partly overlapping region be increased by making the size of each ink droplets ejected in the partly overlapping region larger than the size of the ink droplets ejected in the non-overlapping region.

By doing so, the amount of ink ejected per unit area may be suitably increased.

Also, the amount of ink ejected per unit area in the partly overlapping region may be increased by making the number of ink droplets ejected in the partly overlapping region larger than the number of the ink droplets ejected in the non-overlapping region.

By doing so, the amount of ink ejected per unit area may be suitably increased.

Also, it is desirable that the first nozzle row and the second nozzle row be arranged to be alienated from each other in the intersecting direction.

By doing so, in the printing apparatus described above, with a configuration that the influence due to meandering of the medium is not significant, even when the percentage of the pixels in which the ink does not land increases compared with that of the non-overlapping region, pixels in which the ink does not land may be suitably filled since the amount of ink ejected in the region where the plural nozzle rows overlap has been increased in advance. Furthermore it is possible to suppress a decrease in the picture quality.

EXAMPLES

1. Configuration of the Printer 1

In the printer 1 of the examples, it is possible to eject four colors of colored ink (a yellow ink Y, a magenta ink M, a cyan ink C, a black ink K). The inks used in the examples are the photocurable inks (ultraviolet curable inks).

Figures 1, 2:
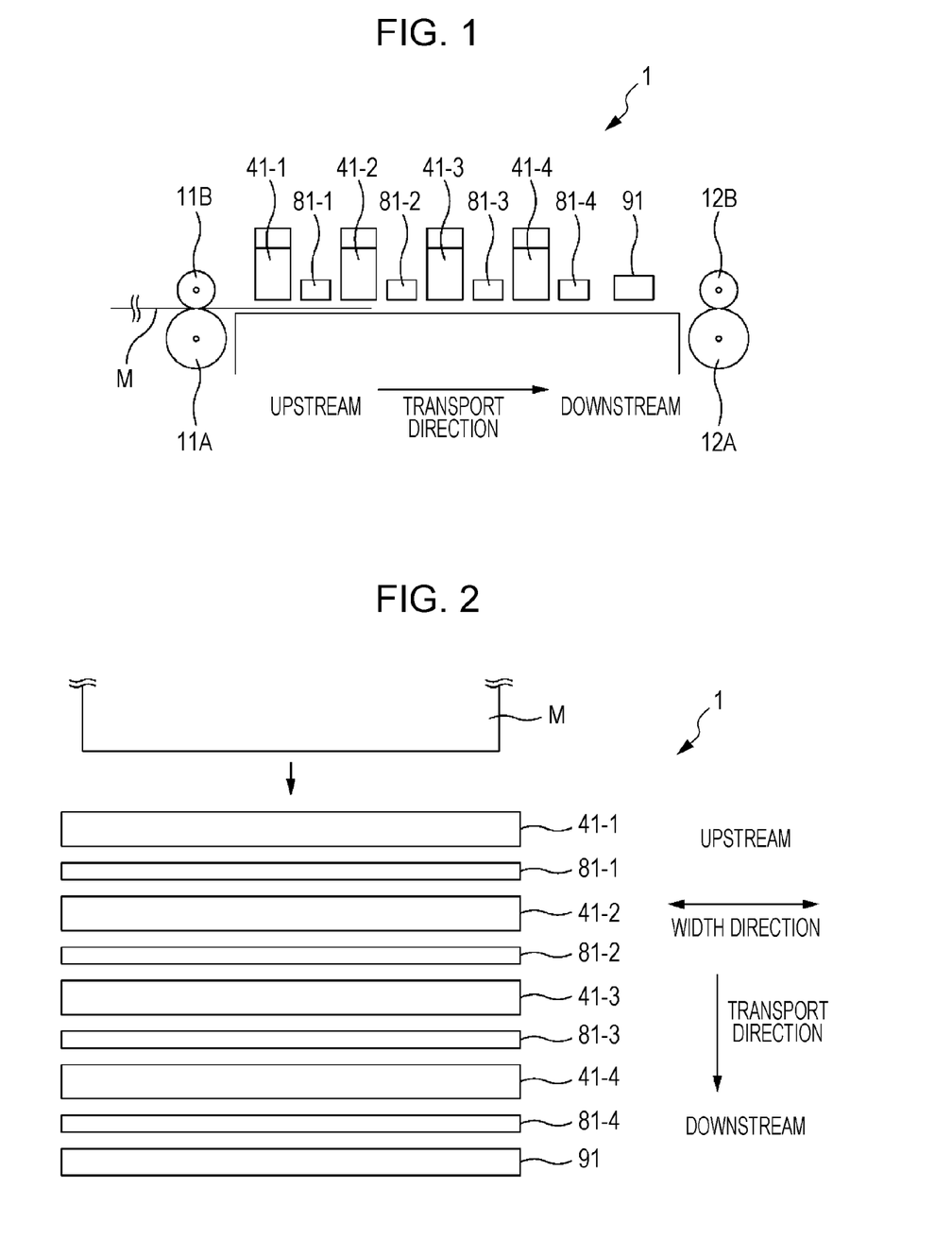
FIG. 1 is a schematic side view of a printer in an example.
FIG. 2 is a schematic top view of the printer in the example.
Figure 3:
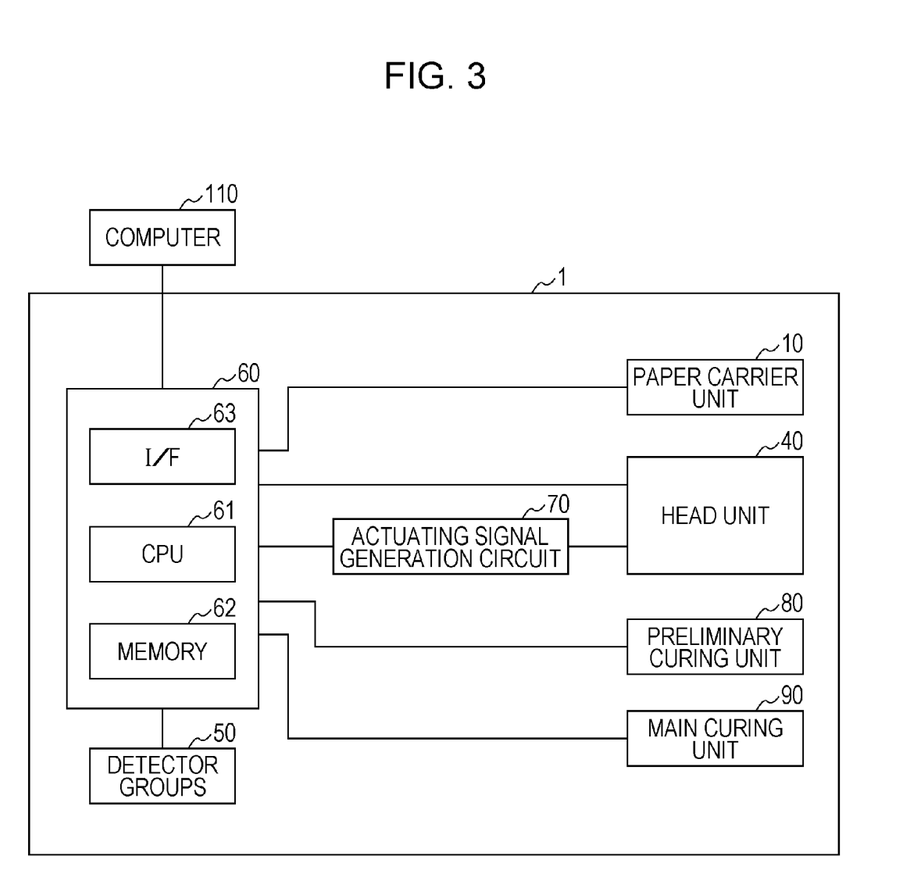
FIG. 3 is a block diagram of the printer in the example.

FIG. 1 is a schematic side view of a printer 1 in an example.
FIG. 2 is a schematic top view of the printer 1 in the example.
FIG. 3 is a block diagram of the printer 1 in the example. Description of the configuration of the printer 1 will be made below with reference to these figures.

In FIG. 3, a computer 110 and the printer 1 are shown. The printer 1 is equipped with a paper transport unit 10, a head unit 40, a detector group 50, a controller 60, a driving signal generation circuit 70, a preliminary curing unit 80, and a main curing unit 90.

The paper transport unit 10 includes a transport roller 11A, a first pressing roller 11B, a paper ejection roller 12A, and a second pressing roller 12B. The transport roller 11A and the paper ejection roller 12A are connected to a motor (not shown) and the rotation of the motor is controlled by the controller 60. Through being pinched between the transport roller 11A and the first pressing roller 11B, a medium is transported in the transport direction. Also, through being pinched between the paper ejection roller 12A and the second pressing roller 12B, the medium is transported in the transport direction and is ejected.

The head unit 40 includes a yellow head unit 41-1, a magenta head unit 41-2, a cyan head unit 41-3, and a black head unit 41-4. The configuration of these head units will be described later.

The detector group 50 represents a variety of detectors that detect the information from each section of the printer 1 and send the information to the controller 60.

The controller 60 is a control unit to control the printer 1. The controller 60 contains a CPU 61, a memory 62, and an interface section 63. The CPU 61 is a calculation processing unit to control the printer as a whole. The memory 62 secures the program storage area or the work area, and has a storage element such as a RAM, an EEPROM and the like. The CPU 61 controls each unit according to the programs stored in the memory 62. The interface section 63 transmits and receives data between the computer 110 which is an external device, and the printer 1.

The driving signal generation circuit 70, applied to driving element such as a piezoelectric element and the like which is included in the head which will be described later, generates a driving signal in order to eject ink droplets. The driving signal generation circuit 70 includes a DAC (not shown) and generates an analog voltage signal based on the digital data regarding the waveform of the driving signal sent from the controller 60. Also, the driving signal generation circuit 70 includes an amplifier circuit (not shown), performs power amplification on the voltage signal generated, and generates the driving signal.

The preliminary curing unit 80 performs preliminarily curing (hereinafter, "preliminary curing" may sometimes be called "pinning") of the landed ink by irradiating ultraviolet light on the ultraviolet curable ink that has landed on the medium. That is, movement of the ink is suppressed by increasing the viscosity of the ink surface that lands on the medium. By increasing the viscosity of the ink surface that is landed, it is difficult for the ink to move together, even if more ink is landed in the vicinity of the ink. In other words, it is possible to suppress the integration of the ink.

The preliminary curing unit 80 includes four sets of LED assembly units 81-1 to 81-4. These LED assembly units 81-1 to 81-4, arranged on the upstream side in the transport direction of the medium M, preliminary cure the ejected ink. The configuration of the LED assembly unit 81 will be described later.

The main curing unit 90 includes a light source unit for main curing 91. The light source unit for main curing 91 is located furthest downstream in the transport direction as shown in FIG. 2. Then, light including ultraviolet light is irradiated on the medium M and cures each ink that lands on the medium M. In the main curing, as a light source of the light source unit for main curing 91 in the examples, a metal halide lamp is used.

Regarding Nozzle Arrangement

Figure 4A:
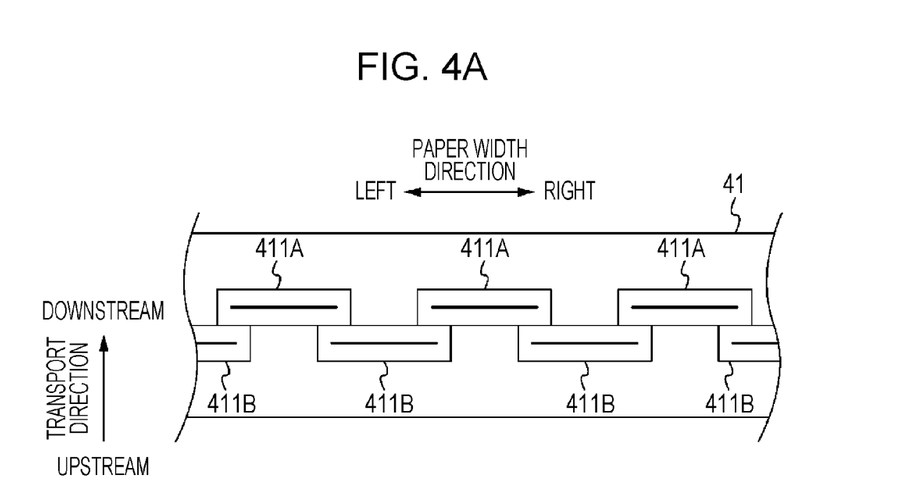
FIG. 4A is a diagram which shows an arrangement of heads installed in a head unit.
Figure 4B:
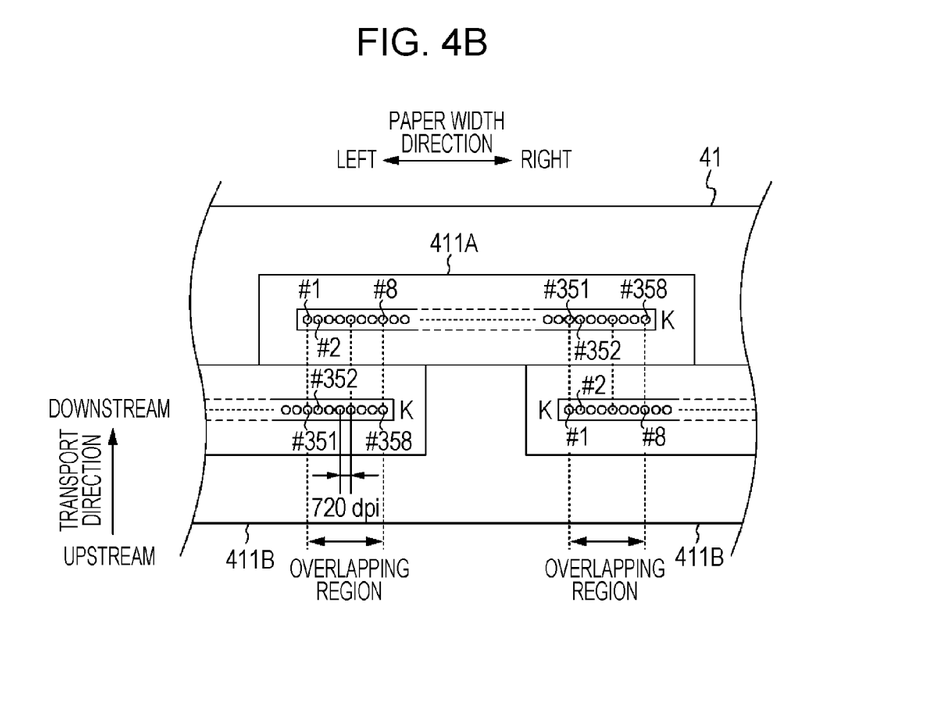
FIG. 4B is a diagram which shows an arrangement of the nozzle underside of the heads.

FIG. 4A is a diagram which shows an arrangement of heads 411A and 411B installed in a head unit 41, and FIG. 4B is a diagram which shows an arrangement of the nozzle underside of the heads 411A and 411B. In the printer 1 of the example, as shown in FIG. 4A, multiple numbers of heads 411A and 411B are arranged in line in the paper width direction which intersects the transportation direction and the ends of each of the heads 411A and 411B are arranged to be overlapped. Also, the head 411A and 411B that are adjacent to each other in the paper width direction are arranged to be staggered in the transport direction (arranged in a zigzag shape). In the heads 411A and 411B that are adjacent to each other in the paper width direction, the head 411A downstream of the transport direction is called a "downstream head 411A" and the head 411B upstream of the transport direction is called an "upstream head 411B". Also, the heads 411A and 411B that are adjacent to each other in the paper width direction are collectively termed "adjacent heads".

In FIG. 4B, the nozzle is seen in cut-away section from the top of the head. As shown in FIG. 4B, at the underside of the heads 411A and 411B, a black nozzle row K which ejects black ink is formed. Each nozzle row is composed of 358 nozzles (#1 to #358). Also, the nozzles of each nozzle row are arranged in line at regular intervals (for example, 720 dpi) in the paper width direction. In addition, for the nozzles that belong to each nozzle row, numbers are given in sequence starting from left in the paper width direction (#1 to #358).

In the heads 411A and 411B, arranged in line in the paper width direction, eight nozzles at the end of each head are arranged to be overlapped. More specifically, by overlapping the eight nozzles (#1 to #8) at the left end of the nozzle row of the downstream head 411A with the eight nozzles (#351 to #358) at the right end of the nozzle row of the upstream head 411B, the eight nozzles (#351 to #358) at the right end of the nozzle row of the downstream head 411A overlaps with the eight nozzles (#1 to #8) at the left end of the nozzle row of the upstream head 411B. As shown in the diagram, in the adjacent heads 411A and 411B, the region that the nozzles overlap is called an "overlapping region". Also the nozzles (#1 to #8, #351 to #358) belonging to the overlapping region are called "overlapping nozzles".

Also, the position in the paper width direction of the nozzles that are overlapped at the end of the heads 411A and 411B, arranged in line in the paper width direction, match. That is, the position in the paper width direction of the nozzles at the end of the downstream head 411A and the corresponding position in the paper width direction of the nozzles at the end of the upstream head 411B are the same. For example, the position in the paper width direction of the nozzle #1 arranged at the far left end of the downstream head 411A and the position in the paper width direction of the nozzle #351 arranged eighth from the right end of the upstream head 411B are the same and the position in the paper width direction of the nozzle #8 arranged eighth from the left end of the downstream head 411A and the position in the paper width direction of the nozzle #358 arranged at the far right end of the upstream head 411B are the same. Also, the position in the paper width direction of the nozzle #358 arranged at far right end of the downstream head 411A and the position in the paper width direction of the nozzle #8 arranged eighth from the left end of the upstream head 411B are the same and the position in the paper width direction of the nozzle #351 arranged eighth from the right end of the downstream head 411A and the position in the paper width direction of the nozzle #1 arranged at the far left end of the upstream head 411B are the same.

By arranging the multiple number of heads 411A and 411B in the head unit 41 of each color, it is possible to arrange the nozzles in line at the same interval (720 dpi) over the whole area in the paper width direction. As a result, a dot array with the dots arranged in line at the same interval (720 dpi) may be formed over the length of the paper width.

Regarding the Irradiation Device

Figure 5:
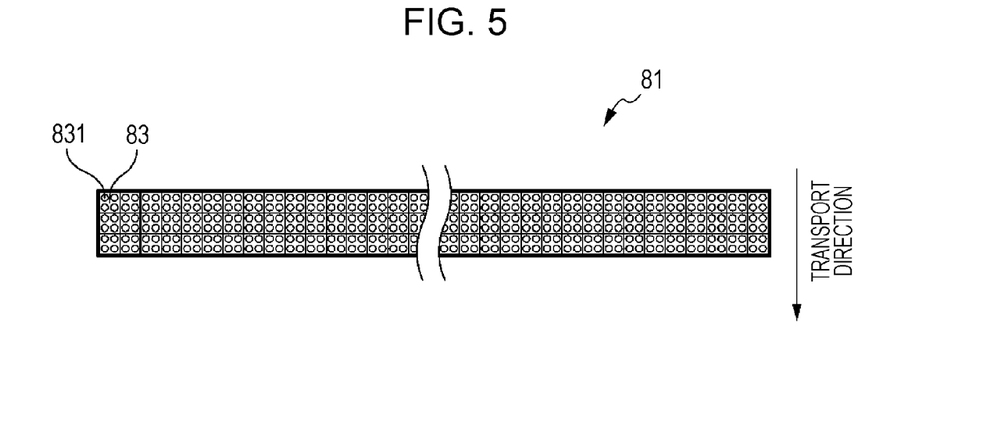
FIG. 5 is an explanatory diagram of an LED assembly unit in a preliminary curing unit.

FIG. 5 is an explanatory diagram of an LED assembly unit 81 in a preliminary curing unit 80. The preliminary curing unit 80 includes four sets of LED assembly units 81-1 to 81-4. In these four LED assembly units 81, a common configuration is used, which reduces manufacturing costs. The LED assembly unit 81 is composed of plural LEDs 831. This provides a wider irradiation area than the width of the media printed.

The light source unit for main curing 91, like the LED assembly unit 81, is also composed of plural LEDs arranged in line. However, in order to cure the ink, the number of LEDs is increased than that of the preliminary curing unit 80.

Also, in the light source unit for main curing 91, the light of a different wavelength from that of the preliminary unit 80 may be irradiated for curing or the intensity of the same wavelength as that of the preliminary unit 80 may be strengthened.

Figure 6:
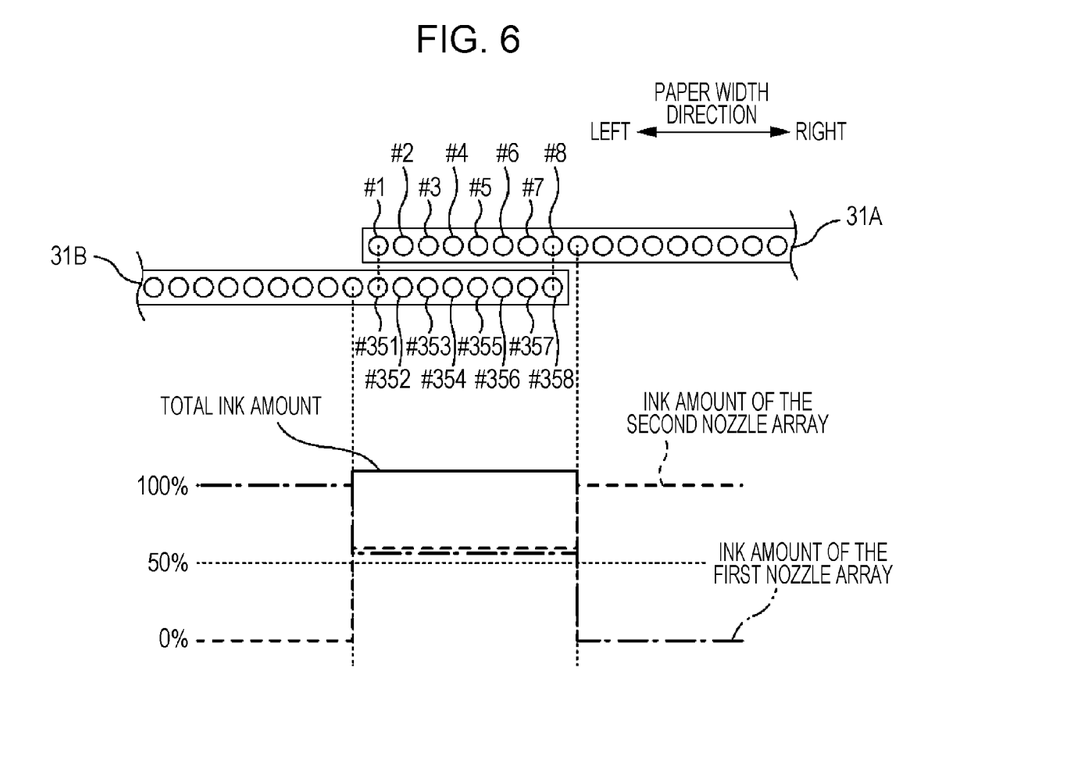
FIG. 6 is an explanatory diagram of an ink amount in the overlapping region in the example.

FIG. 6 is an explanatory diagram of an ink amount in the overlapping region in the example. In this case, the amount of ink ejected in the overlapping region is uniformly larger than the amount of ink ejected in the non-overlapping region. For example, when beta printing with the concentration of 100% is carried out on the front side of the media, the printing is carried out with more than 100% duty in the overlapping region, whereas the printing is carried out with 100% duty in the non-overlapping region. Here, the duty is the amount of the ink impacting the pixel. 100% duty indicates the amount in which all the pixels are filled with a single colored ink. In the printer 1 of the examples, the maximum amount of the ink that each nozzle ejects is a duty of 100%. In the overlapping region, printing may be carried out when the duty is more than 100% due to the overlapped nozzle row. Therefore, the amount of ink ejected per unit area in the overlapping region is uniformly larger than the amount of ink ejected per unit area in the non-overlapping region.

Figure 7:
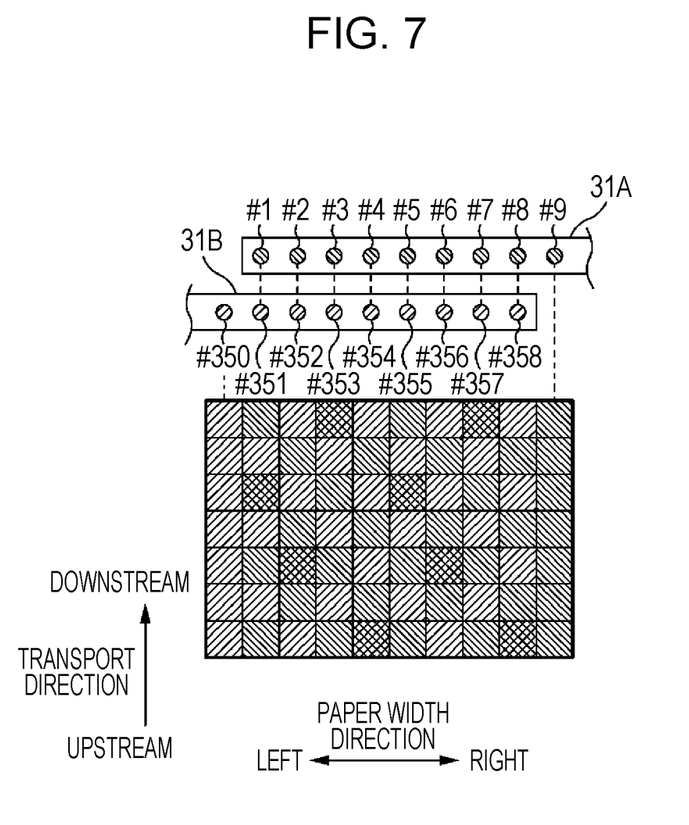
FIG. 7 is a diagram illustrating a pixel forming a dot.

FIG. 7 is a diagram illustrating a pixel forming a dot. In the diagram, the nozzle row of the upstream head 411B and the downstream head 411A are shown. Also, under these nozzles, the dot forming pixel is shown in cell shape. In the diagram, the direction of hatching that is used for each nozzle and the direction of hatching of the pixel that is responsible for the dot formation in the nozzle match. As shown in the diagram, two nozzle rows share the dot formation in the overlapping region.

In the overlapping region, there are pixels which eject ink from both sides: the nozzle of the upstream head 411B and the downstream head 411A. In these pixels of the diagram, both hatchings, the hatching at the upper right and the hatching at the upper left, are carried out. In this way, the amount of ink ejected per unit area in the overlapping region may be increased to more than the amount of ink ejected per unit area in the non-overlapping region.

The method to increase the amount of ink ejected per unit area in the overlapping region is not limited to the above description. For example, by making the size of the ink droplets in the overlapping region larger than the size of the ink droplets in the non-overlapping region, the amount of ink ejected per unit area in the overlapping region may be increased.

Therefore, in order to make the amount of ink in the overlapping area larger than the amount of ink in the non-overlapping region, the grayscale data of the image printed, can be multiplied by a value greater than "1" across the entirety of the overlapping region. For example, when the amount of ink in the overlapping region is increased by 5% more than the amount of ink in the non-overlapping region, the grayscale multiplied by 1.05 is required as the grayscale of each pixel corresponding to the portion which the nozzles in the overlapping region form. Additionally, for the corrected grayscale as described above, allocating the dots formed by size, dithering, allocating the dots formed by the first nozzle row and by the second nozzle row and the like are carried out. In this way, the amount of ink ejected in the overlapping region may be increased.

Figure 8:
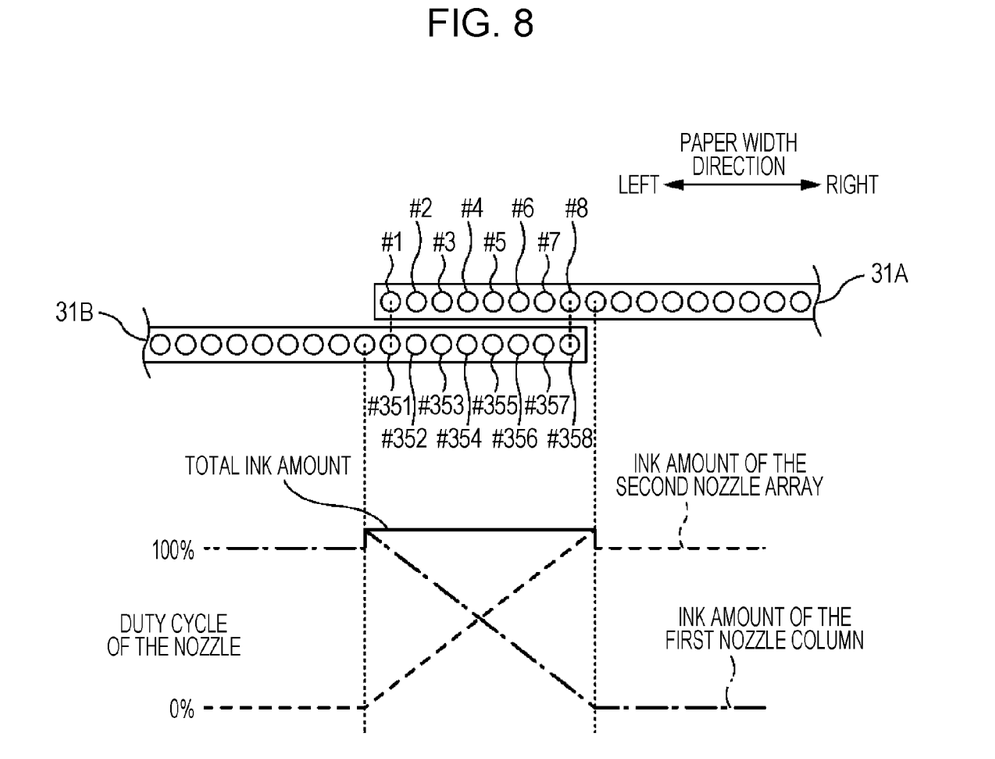
FIG. 8 is an explanatory diagram of the ink amount in the overlapping region in other example.

FIG. 8 is an explanatory diagram of the ink amount in the overlapping region in other example. The amount of ink in the overlapping region shown in FIG. 6 is realized through increasing a fixed amount in all the nozzles in the overlapping region. In FIG. 8, it is set such that the closer the nozzles in the non-overlapping region, the larger the amount of the ink ejected and the closer the nozzle to the end portion of the nozzle row, the smaller the amount of ink ejected.

In this way, by increasing the amount of ink in the overlapping region, the printing may be carried out by increasing the concentration in the overlapping region. Also, in the examples, in order to suppress a solidification of the ink in the vicinity, therefore, making the occurrence of deflection difficult, and moreover to suppress the deterioration of the image quality, the ink described as follows is used.

2. Preparation of a Radiation Curable Ink Composition 2.1 Ink Composition in Examples 1 to 8

The ink in examples 1 to 8 contains the compounds below. % by mass content is shown in the table shown later.

Amino acrylate

Tetraethylene glycol diacrylate

Bis(2,4,6-trimethyl benzoyl)-phenyl phosphine oxide and 2,4,6-trimethyl benzoyl-diphenyl-phosphine oxide Diethyl thioxanthone The compound shown in the formula below (Chem. 1)

Chem. 1

2.2 Ink Composition in Comparative Example 1

The ink in comparative example 1 contains the following compounds below. % by mass content is shown in the table shown later.

Amino acrylate

Tetraethylene glycol diacrylate

Bis(2,4,6-trimethyl benzoyl)-phenyl phosphine oxide and 2,4,6-trimethyl benzoyl-diphenyl-phosphine oxide Diethyl thioxanthone 2-(2-Vinyloxyethoxy)ethyl acrylate (CAS:86273-46-3) (manufactured by Nippon Shokubai, Co., Ltd.)

2.3 Ink Composition in Comparative Example 2

The ink in the comparative example 1 contains the following compounds below. % by mass content is shown in the table shown later.

Amino acrylate

Tetraethylene glycol diacrylate

Bis(2,4,6-trimethyl benzoyl)-phenyl phosphine oxide and 2, 4,6-trimethyl benzoyl-diphenyl-phosphine oxide Diethyl thioxanthone 2-(2-Vinyloxyethoxy)ethyl methacrylate (CAS:76392-22-8) (manufactured by Nippon Shokubai Co., Ltd.)

TABLE 1

| | Component name | Example 1 | Example 2 | Example 3 | Example 4 | Example 5 | Example 6 | Comparative example 1 | Comparative example 2 |
|---|---|---|---|---|---|---|---|---|---|
| (A) component (% by mass) | Amino acrylate | 5.0 | 5.0 | 8.0 | 5.0 | 5.0 | 5.0 | 5.0 | 5.0 |
| (B) component (% by mass) | Tetraethylene glycol diacrylate | 51.0 | 39.0 | 39.0 | 41.0 | 44.0 | 35.0 | 51.0 | 35.0 |
| (C) component (% by mass) | Bis(2,4,6-trimethyl benzoyl)-phenyl phosphine oxide | 5.0 | 5.0 | 5.0 | 5.0 | 5.0 | 11.0 | 5.0 | 11.0 |
| (D) component (% by mass) | 2,4,6-trimethyl benzoyl-diphenyl-phosphine oxide | 5.0 | 5.0 | 5.0 | 5.0 | 5.0 | 20.0 | 5.0 | 20.0 |
| (E) component (% by mass) | Diethyl thioxanthone | 1.0 | 1.0 | 1.0 | 1.0 | 1.0 | 18.0 | 1.0 | 18.0 |
| (F) component (% by mass) | compound shown in (chem.1) | 33.0 | 45.0 | 42.0 | 43.0 | 40.0 | 11.0 | 0 | 0 |
| (G) component (% by mass) | 2-(2-Vinyloxyethoxy)ethyl acrylate (CAS: 86273-46-3) (manufactured by Nippon Shokubai Co., Ltd.) | 0 | 0 | 0 | 0 | 0 | 0 | 0.0 | 33 |
| (H) component (% by mass) | 2-(2-Vinyloxyethoxy)ethyl methacrylate (CAS: 76392-22-8) (manufactured by Nippon Shokubai, Co., Ltd.) | 0 | 0 | 0 | 0 | 0 | 0 | 33 | 0.0 |
| | Total Amount | 100.0 | 100.0 | 100.0 | 100.0 | 100.0 | 100.0 | 100.0 | 100.0 |

3. Evaluation of the Stability of the Droplet Ejection (Evaluation of Ejection Stability)

Using the photocurable ink in each example and comparative example, an evaluation was performed by the tests described below.

3.1 Evaluation of the Accuracy of the Landing Position

The printer 1 and the photocurable ink set in each example and comparative example which were installed in the chamber (thermal chamber) were prepared. While keeping the driving waveform of the piezoelectric element optimized, and in an environment of 25° C. and 55% RH, continuous ejection of the droplets for 2,000,000 rounds (2,000,000 droplets) from each nozzle of the head was carried out on each color of ink. Then, the operation of the printer 1 was stopped and left for 120 hours in an environment of 25° C. and 55% RH, while the flow path of the printer 1 was kept filled with each ink.

Then, from each nozzle of the head, in an environment of 25° C. and 55% RH, continuous ejection of the droplets for 3,000,000 rounds (3,000,000 droplets) was carried out. For the 3,000,000 rounds of droplets that were discharged from the nozzles specified near the center unit of the head after the printer 1 was left for 120 hours, the average value of deviation d of the center position of the droplet from the center position aimed for was determined and was evaluated by the following five grades. The smaller the value, the more effectively the occurrence of deflection is prevented.

A: the average value of deviation d is less than 0.09 μm.
B: the average value of deviation d is equal to or more than 0.09 μm and less than 0.15 μm.
C: the average value of deviation d is equal to or more than 0.15 μm and less than 0.18 μm.
D: the average value of deviation d is equal to or more than 0.18 μm and less than 0.22 μm.
E: the average value of deviation d is equal to or more than 0.22 μm.

3.2 Evaluation of the Stability of the Amount of Droplet Ejection

For the printer 1 used in the evaluation 3.1, after continuous ejection of the droplets for 3,000,000 rounds (3,000,000 droplets), the operation of the printer 1 was stopped again and left for 60 hours, in an environment of 25° C. and 55% RH, with the flow path of the printer 1 in a state of being filled with each ink.

Then, from each nozzle of the head, in an environment of 25° C. and 55% RH, continuous ejection of the droplets for 1,500,000 rounds (1,500,000 droplets) was carried out. For the two nozzles specified at both ends, the left end and the right end, of the head, a total value for the droplets ejected was obtained and an absolute value of the difference of the average ejection amount between the droplets ejected from the two nozzles, ΔW[ng], was obtained. Using the ΔW, the ratio (ΔW/WT) of ΔW to the target ejection amount of the droplet, WT[ng] was determined and was evaluated by the following five grades.

The smaller the value, ΔW/WT, the greater the stability of droplet ejection amount.

A: the value of ΔW/WT is less than 0.090.
B: the value of ΔW/WT is equal to or more than 0.090 and less than 0.320.
C: the value of ΔW/WT is equal to or more than 0.320 and less than 0.620.
D: the value of ΔW/WT is equal to or more than 0.620 and less than 0.840.
E: the value of ΔW/WT is equal to or more than 0.840.

3.3 Evaluation of an Intermittent Printing Performance

For the printer 1 used in the evaluation 3.2, after continuous ejection of the droplets for 1,500,000 rounds (1,500,000 droplets), the operation of the printer 1 was stopped again and left for 60 hours in an environment of 25° C. and 55% RH, while the flow path of the printer 1 was kept filled with each ink.

Then, from each nozzle of the head, in an environment of 25° C. and 55% RH, continuous ejection of the droplets for 200,000 rounds (200,000 droplets) was carried out and the ejection of the droplets was stopped for 180 seconds (first sequence). Then, continuous ejection of the droplets and stopping of the ejection for 180 seconds of the droplets were repeated. For the nozzles specified near the center unit of the head, the average weight W1 [ng] of the droplet discharged in the first sequence and the average weight W30 [ng] of the droplets discharged in the thirtieth sequence were obtained. Furthermore, the ratio (|W1-W30|/WT) of the absolute value of the difference between W1 and W30 to the target ejection amount of the droplet, WT[ng], was determined and was evaluated by the following five grades. The smaller the value, |W1-W30|/WT, the better the performance of the intermittent printing (stability of droplet ejection amount).

A: the value of |W1-W30|/WT is less than 0.060.
B: the value of |W1-W30|/WT is equal to or more than 0.060 and less than 0.150.
C: the value of |W1-W30|/WT is equal to or more than 0.150 and less than 0.470.
D: the value of |W1-W30|/WT is equal to or more than 0.470 and less than 0.730.
E: the value of |W1-W30|/WT is equal to or more than 0.730.

3.4 Continuous Ejection Test

For the printer 1 used in the evaluation 3.3, after the thirtieth sequence of droplet ejection, the operation of the printer 1 was stopped again and left for 60 hours in an environment of 25° C. and 55% RH, while the flow path of the printer 1 was kept filled with each ink.

Then, in an environment of 25° C. and 55% RH, by continuous operation of the printer 1 for 200 hours, the ejection of each ink that consists of photocurable ink set from each nozzle of the head was carried out.

The incidence of the clogging of nozzles in the head ([(number of nozzles clogging)/(total number of nozzles)]× 100) was obtained after continuous operation, and for the nozzles in which clogging occurred, whether the clogging was eliminated by using plastic materials as cleaning materials was examined. The result was evaluated using the following five grades.

A: no occurrence of the nozzle clogging.
B: the incidence of the nozzle clogging is less than 0.7% (with the exception of zero), and elimination of the clogging by cleaning is possible.
C: the incidence of the nozzle clogging is equal to more than 0.7% and less than 1.2%, and elimination of the clogging by cleaning is possible
D: the incidence of the nozzle clogging is equal to more than 1.2% and less than 1.5%, and elimination of the clogging by cleaning is possible
E: the incidence of the nozzle clogging is equal to more than 1.5%, and elimination of the clogging by cleaning is impossible.

The evaluations in the examples and the comparative examples were carried out under the same conditions.

4. Production of the Printed Material

For the printer 1 used in the evaluation 3.4, after continuous operation for 200 hours, the operation of the printer 1 was stopped again and left for 60 hours in an environment of 25° C. and 55% RH, with the flow path of the printer 1 in a state of being filled with each ink.

Then, the photocurable ink was ejected in a predetermined pattern onto a substrate made of polyethylene terephthalate (PET).

Then, an ultraviolet light with a spectrum of maximum value at the wavelengths of 365 nm, 380 nm, and 395 nm and with an irradiation intensity of 180 mW/cm$^2$ was irradiated for 20 seconds, and an interior panel as the printed material was obtained after the photocurable ink is cured on the substrate.

Using the method as described above, photocurable ink (photocurable ink set) in the examples and the comparative examples was used to produce 10 prints each.

5. Evaluation of the Printed Materials

Each of the printed materials produced by the method described above was evaluated as follows.

5.1.1 Evaluation of the Appearance of the Printed Materials

Each of the printed materials produced in the examples and the comparative examples were visually observed, the occurrence of uneven color and uneven density was measured, and the appearance was evaluated by the following seven grades.

A: has an extremely excellent appearance.
B: has a markedly excellent appearance.
C: has an excellent appearance.
D: has a good appearance.
E: has a somewhat poor appearance.
F: has a poor appearance.
G: has an extremely poor appearance 5.1.2 Evaluation of the Appearance of the Printed Materials (Related to the Portion where the End of the First Nozzle Row is Overlapped with the End of the Second Nozzle Row)

Each of the printed materials produced in the examples and the comparative examples were visually observed, the occurrence of uneven color and uneven density was measured, and the appearance was evaluated by the following seven steps of criteria.

A: has an extremely excellent appearance.
B: has a markedly excellent appearance.
C: has an excellent appearance.
D: has a good appearance.
E: has a somewhat poor appearance.
F: has a poor appearance.
G: has an extremely poor appearance 5.2 Characteristic Differences Between Objects Each of the ten printed materials produced in the examples and the comparative examples were visually observed, and the uniformity of the appearance (aesthetics) was evaluated by the following four grades.

A: The uniformity of the appearance is excellent.
B: The uniformity of the appearance is good.
C: The uniformity of the appearance is somewhat poor.
D: The uniformity of the appearance is poor.

The results are shown in Table 2.

TABLE 2

| | | Example 1 | Example 2 | Example 3 | Example 4 | Example 5 | Example 6 | Comparative example 1 | Comparative example 2 |
|---|---|---|---|---|---|---|---|---|---|
| Evaluation of the stability of the droplet ejection | Evaluation of the accuracy of the landing position | A | B | A | A | A | B | D | E |
| | Evaluation of the stability of the amount of droplet ejection | A | A | B | A | B | A | D | E |

TABLE 2-continued

|  |  | Example 1 | Example 2 | Example 3 | Example 4 | Example 5 | Example 6 | Comparative example 1 | Comparative example 2 |
|---|---|---|---|---|---|---|---|---|---|
|  | Evaluation of an intermittent printing performance | A | A | A | B | A | A | D | E |
|  | Continuous ejection test | A | B | A | A | A | A | E | D |
| Evaluation of the printed materials | Evaluation of the appearance of the printed materials | A | A | A | A | A | A | G | G |
|  | Evaluation of the appearance of the printed materials (related to the portion where the end of the first nozzle row is overlapped with the end of the second nozzle row) | A | A | A | A | A | A | G | G |
|  | Characteristic differences between objects | A | A | A | A | A | A | G | G |

As shown in Table 2, with the ink composition in examples 1 to 8, good evaluation results were obtained compared with comparative example 1 and comparative example 2. In particular, when the ink composition in example 1 was used, the results of all the evaluations were "A", which gave the best results.

The ink in the comparative examples is susceptible to curing with by low energy ultraviolet light, and the ink around the nozzle is easily solidified by natural light. The solidification of the ink has an adverse effect on the evaluation of the stability of the droplet ejection. Also, if the ink is solidified around the nozzle, deflection occurs after the ejection, the accuracy of the landing position is deteriorated, and, particularly, a white line appears in the overlapping region of nozzle rows; therefore, uneven density is likely to occur.

On the other hand, the ink in examples 1 to 8, since containing the compounds shown in (Chem. 1), is not susceptible to curing with low energy ultraviolet light. Therefore, the ink around the nozzle is not readily solidified by natural light. Good evaluation results of the stability of droplet ejection are considered to be obtained as a result.

Therefore, by using the ink of examples 1 to 8, the ejection characteristics of the droplet become good and the image quality in the overlapping region of the nozzle rows remains good. In addition, even when the ink around the nozzle is solidified by natural ultraviolet light, the degradation of image quality is suppressed by the suppression of the concentration decrease in the overlapping region of the nozzle rows in the printer 1 of the examples.

Other Examples

In each of the examples, although a printing system with the ink jet printer is primarily described, the disclosure of the correction method of the uneven density and the like is also included. Also, the examples are intended to facilitate the understanding of the invention, and are not intended to limit the interpretation of the invention. The invention may be altered or improved without departing from the basic scope thereof, and it is needless to say that the invention includes the equivalent. In particular, the embodiment described below is also included in the invention.

Regarding the Printer

In each of the examples, the printer (a so-called line head printer) was used as the example where the plural heads are arranged in line over the length of the paper width and the image is formed by the paper being transported under the fixed heads. However, the invention is not limited to this type of printer. For example, a printer (a so-called serial type printer) may be adopted where the plural heads are arranged to the direction of the nozzle row. And the motion that forms the image by moving the plural heads in the direction that intersects the nozzle row direction with regard to the paper and the motion that transports the paper to the nozzle row direction in the plural heads is alternately repeated. Even in a case where the serial type printer is adopted, as in the examples described, it is possible to print with the increased amount of ink in the overlapping region of the heads compared with that along the non-overlapping region.

Regarding the Printing Apparatus

In each of the examples, an ink jet printer was used as the example as the printing apparatus. However, the invention is not limited to the ink jet printer. As long as it is a printing apparatus, not only a printer, but also a variety of industrial printing apparatuses may be applicable. For example, a printing apparatus to apply designs to fabric, color filter manufacturing equipment, display manufacturing equipment such as an organic EL display, DNA chip manufacturing equipment which produces a DNA chip by applying a DNA solution on a chip, may adopt the invention.

In addition, a fluid ejection method may be a piezoelectric method in which the fluid is ejected by expansion and contraction of the ink chamber when a voltage is applied to the driving element (piezoelectric element), or a thermal method in which the fluid is ejected by bubbles that are generated in the nozzle using a heating element. In addition, the fluid is not limited to a liquid such as ink, and a powder and the like may be used.

What is claimed is:

1. A printing method comprising:
    ejecting an ink which includes a compound shown by Chemical 1 from a first nozzle row which is relatively moved in an intersection direction intersecting a direction along the nozzle row with respect to a medium,
    ejecting the ink while relatively moving in the intersection direction to the medium, from the end portion of a second nozzle row which is overlapped with the end portion of the first nozzle row in a direction along the nozzle row,
    wherein when nozzles of the nozzle rows which are partly overlapped with each other in a direction along the nozzle row shared with each other to form a common dot line, the amount of ink ejected per unit area in the partly overlapping region is larger than the amount of ink ejected per unit area in a non-overlapping region,
    wherein the ink also comprises elements selected from the group consisting of an amino acrylate, a Tetraethylene glycol diacrylate, a Bis(2,4,6-trimethyl benzoyl)-phenyl phosphine oxide, a 2,4,6-trimethyl benzoyl-diphenyl-phosphine oxide, a Diethyl thioxanthone, a 2-(2-Vinyloxyethoxy)ethyl acrylate, and a 2-(2-Vinyloxyethoxy)ethyl methacrylate

[Chemical 1]

2. The printing method according to claim 1, wherein the ink is an ultraviolet curable ink, and an ultraviolet light irradiation device that cures the ink by irradiating ultraviolet light is used.

3. The printing method according to claim 1, wherein the amount of ink ejected per unit area in the partly overlapping region is uniformly increased from the amount of ink ejected per unit area in a non-overlapping region.

4. The printing method according to claim 1, wherein the amount of ink ejected from the nozzles of the partly overlapping nozzle rows is equally shared in the formation of a dot common line.

5. The printing method according to claim 1, wherein the amount of ink ejected is determined based on a grayscale that is obtained by multiplying parts of an image corresponding to the partly overlapping region by a value greater than 1.

6. The printing method according to claim 1, wherein the amount of fluid ejected per unit area in the partly overlapping region is increased by making the size of each of the ink droplets ejected in the partly overlapping region larger than the size of the ink droplets ejected in the non-overlapping region.

7. The printing method according to claim 1, wherein the amount of ink ejected per unit area in the partly overlapping region is increased by making the number of ink droplets ejected in the partly overlapping region larger than the number of the ink droplets ejected in the non-overlapping region.

8. The printing method according to claim 1, wherein the first nozzle row and the second nozzle row are arranged to be alienated from each other in the intersecting direction.

* * * * *